No. 814,935. PATENTED MAR. 13, 1906.
A. BURGESS.
BATTER MIXING MACHINE.
APPLICATION FILED MAY 2, 1904.

WITNESSES
T. G. Massey
May E. Kott

INVENTOR
Alexander Burgess
By Parker & Burton
Attorneys.

UNITED STATES PATENT OFFICE.

ALEXANDER BURGESS, OF DETROIT, MICHIGAN.

BATTER-MIXING MACHINE.

No. 814,935.

Specification of Letters Patent.

Patented March 13, 1906.

Application filed May 2, 1904. Serial No. 205,971.

*To all whom it may concern:*

Be it known that I, ALEXANDER BURGESS, a citizen of the United States, residing at Detroit, county of Wayne, State of Michigan, have invented a certain new and useful Improvement in Batter-Mixing Machines; and I declare the following to be a full, clear, and exact description of the invention, such as will enable others skilled in the art to which it pertains to make and use the same, reference being had to the accompanying drawings, which form a part of this specification.

This invention relates to mixing-machines. It has for its object an improved receptacle, that may be held in one hand and operated by the other, in which to mix and from which to drop in determinable quantities batter or similar substances used in cooking.

It consists of a receptacle in which there is a rotating mixing-blade and which is provided with an opening at the bottom closed by a valve, and the valve is provided with connections by means of which it may be actuated from the handle of the utensil.

Figure 1:
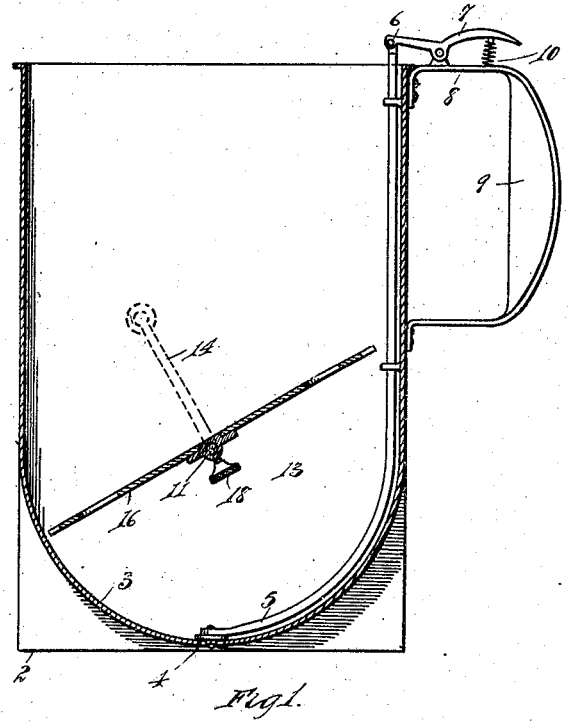
Figure 2:
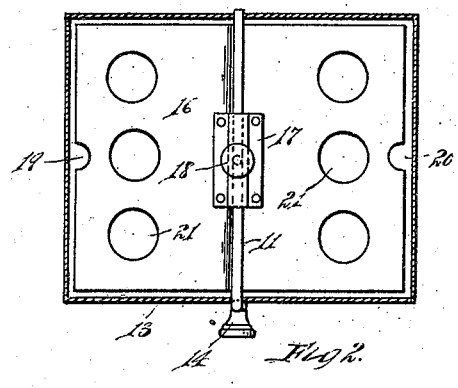

In the drawings, Figure 1 is a sectional elevation. Fig. 2 is a plan of the mixer.

The vessel or receptacle is preferably rectangular in cross-section with a bottom rounded, but provided at the sides with extensions that reach below the bottom in order that the receptacle can rest securely on the bottom edge 2. The bottom 3 of the receptacle proper is rounded and is provided at its lowermost point with a valve 4, which opens upward and which is held at the bottom of a curved valve-stem 5, that extends around the curve of the bottom and up at the back of the receptacle and is pivotally connected by pivot 6 to a thumb-lever 7, mounted on the horizontal part 8 of the handle. The handle is provided with an enlarged grip 9, and the thumb-lever 7 oscillates against a spring 10, placed between itself and the handle, and the spring serves to hold the rear of the thumb-lever upward and serves to hold the valve-stem 5 down with the valve 4 on its seat. At the center of the curved bottom 3 is a shaft 11, one end of which is journaled in bearings on one of the sides of the receptacle and the other end of which extends through the side 13 and is provided external to the receptacle with a crank 14. The beater or mixer 16 is provided with a tubular bearing 17, with wings thereto, which is secured to the mixer and through the tubular part of which the shaft 11 engages, and the mixer is held in place on the shaft by a set-screw 18. The mixer is provided at each side with notches 19 and 20, which enable the rotating mixer to clear the valve and the valve-stem and in connection with a number of holes or perforations 21 in the mixer enable the same to be rotated easily and mix the contents of the receptacle thoroughly.

In use the receptacle, with its contents, is held in the left hand with the thumb of the left hand on the lever 7. The crank is turned with the right hand, and at intervals when it is desired to drop the contents from the receptacle the valve 4 is lifted by pressing down the thumb end of the lever 7 and is held lifted with the valve-orifice open until the desired amount of the contents has escaped, and the valve automatically closes upon releasing the lever.

The shape and relative location of the stem 5 develop the resilient quality of the lower portion of the same to hold the valve properly in its seat independent of any movement of the stem through its guides.

The receptacle is especially useful for the preparation of batter-cakes or for the distribution of ornamental icings and for similar purposes.

What I claim is—

1. A batter-mixer, consisting of a vessel provided with a handle, vertical sides and a rounded bottom, and with a central orifice through said bottom, a valve closing said orifice, a curved valve-stem engaging along the curved bottom and a vertical side and terminating with its upper end adjacent to the handle, an actuating-lever pivoted to the handle and to the valve-stem and provided with a thumb-piece, a beater on a shaft central to the curved bottom and provided with an actuating-crank, whereby the beater may be actuated by one hand, while the mixer is held and the valve may be actuated by the other hand, substantially as described.

2. A batter-mixer, consisting of a vessel provided with a handle, vertical sides and a rounded bottom, and with a central orifice through said bottom, a valve closing said orifice, a curved valve-stem engaging along the curved bottom and a vertical side and terminating with its upper end adjacent to the handle, an actuating-lever pivoted to the handle and to the valve-stem and provided with a spring-lifted thumb-piece, a beater on a shaft central to the curved bottom and provided with an actuating-crank, whereby the beater may be actuated by one hand while the mixer is held and the valve may be actuated by the other hand, substantially as described.

3. A batter-mixer, consisting of a vessel having vertical sides and a rounded bottom, and with a central orifice through said bottom, a horizontal revoluble shaft having a mixer secured thereto, said shaft being pivoted so as to turn about an axis at the center of curvature of the bottom, a valve adapted to open and close said orifice, an integral stem secured at one end to said valve curved in a plane at right angles to said shaft to extend along the bottom, then extending along a vertical side, a guide for the vertical portion of said stem, a handle to said vessel adjacent to the upper end of said stem, and a lever pivoted to said handle in position to be operated by a hand grasping said handle, said lever being adapted to reciprocate said stem vertically, and a crank upon said shaft outside of said vessel.

4. A batter-mixer, consisting of a vessel having vertical sides and a rounded bottom, and with a central orifice through said bottom, a horizontal revoluble shaft having a mixer secured thereto, said shaft being pivoted so as to turn about an axis at the center of curvature at the bottom, a valve adapted to open and close said orifice, an integral stem secured at one end to said valve curved in a plane at right angles to said shaft to extend along the bottom, then extending along a vertical side, a guide for the vertical portion of said stem, a handle to said vessel adjacent to the upper end of said stem, and a lever pivoted to said handle in position to be operated by a hand grasping said handle, said lever being adapted to reciprocate said stem vertically, said mixer being cut out at its edges to produce a clearance around said stem.

In testimony whereof I sign this specification in the presence of two witnesses.

ALEXANDER BURGESS.

Witnesses:
CHARLES F. BURTON.
WILLIAM M. SWAN.